(12) United States Patent
Banks, Jr. et al.

(10) Patent No.: US 12,240,533 B2
(45) Date of Patent: Mar. 4, 2025

(54) TAILGATE DEACTIVATION SYSTEM

(71) Applicant: Banks Morrison Innovations LLC, Clayton, NC (US)

(72) Inventors: James E. Banks, Jr., Clayton, NC (US); Michael A. Morrison, Clayton, NC (US)

(73) Assignee: Banks Morrison Innovations LLC, Clayton, NC (US)

( * ) Notice: Subject to any disclaimer, the term of this patent is extended or adjusted under 35 U.S.C. 154(b) by 0 days.

(21) Appl. No.: 18/816,813

(22) Filed: Aug. 27, 2024

(65) Prior Publication Data
US 2024/0417003 A1 Dec. 19, 2024

Related U.S. Application Data

(63) Continuation of application No. 18/325,661, filed on May 30, 2023, which is a continuation of application No. 17/514,831, filed on Oct. 29, 2021, now Pat. No. 11,702,148, which is a continuation of application
(Continued)

(51) Int. Cl.
*B62D 33/027* (2006.01)
*E05F 15/60* (2015.01)
*H01H 13/50* (2006.01)

(52) U.S. Cl.
CPC .......... *B62D 33/0273* (2013.01); *E05F 15/60* (2015.01); *H01H 13/50* (2013.01); *E05Y 2201/434* (2013.01); *E05Y 2400/60* (2013.01); *E05Y 2900/546* (2013.01); *H01H 2231/026* (2013.01)

(58) Field of Classification Search
CPC ... B62D 33/037; B60N 3/00; E05Y 2900/546; E05Y 2201/22; E05Y 2800/106; B60Q 1/0088
See application file for complete search history.

(56) References Cited

U.S. PATENT DOCUMENTS

| 3,710,370 A | 1/1973 | Quilici et al. |
| 5,159,312 A | 10/1992 | Engle |
| 5,320,397 A | 6/1994 | Peterson et al. |

(Continued)

FOREIGN PATENT DOCUMENTS

| BR | 102015019522 A2 | 6/2016 |
| CA | 2701478 A1 | 10/2011 |

(Continued)

OTHER PUBLICATIONS

Non-Final Office Action for U.S. Appl. No. 16/816,441, mailed Mar. 25, 2021, 11 pages.
(Continued)

*Primary Examiner* — Jared Fureman
*Assistant Examiner* — Esayas G Yeshaw
(74) *Attorney, Agent, or Firm* — Dority & Manning, P.A.

(57) ABSTRACT

A tailgate deactivation system. A switch includes two terminals configured to be electrically coupled to a tailgate power circuit that supplies power to at least a portion of a tailgate of a vehicle, and an actuator configured to electrically couple the two terminals in an on state to allow power to flow in the tailgate power circuit, and to electrically decouple the two terminals in an off state to inhibit power from flowing in the tailgate power circuit.

23 Claims, 7 Drawing Sheets

Related U.S. Application Data

No. 16/816,441, filed on Mar. 12, 2020, now Pat. No. 11,161,555.

(60) Provisional application No. 62/896,878, filed on Sep. 6, 2019, provisional application No. 62/935,231, filed on Nov. 14, 2019.

(56) References Cited

U.S. PATENT DOCUMENTS

| | | | |
|---|---|---|---|
| 6,095,589 A | 8/2000 | Kinnanen et al. | |
| 6,874,839 B2 | 4/2005 | Acker et al. | |
| 6,905,157 B2 | 6/2005 | Kang et al. | |
| 6,980,096 B1 | 12/2005 | Washington et al. | |
| 7,185,451 B2 | 3/2007 | Tsuchizaki | |
| 7,293,821 B2 | 11/2007 | Tran | |
| 8,109,552 B2 | 2/2012 | Nelson | |
| 8,201,869 B1 | 6/2012 | Butlin, Jr. et al. | |
| 8,348,325 B2 | 1/2013 | Hausler et al. | |
| 8,561,238 B1* | 10/2013 | Inget | B60P 1/435 14/71.1 |
| 8,740,279 B1 | 6/2014 | McGoff et al. | |
| 9,283,994 B2 | 3/2016 | Holzberg et al. | |
| 9,463,746 B2 | 10/2016 | Butlin, Jr. et al. | |
| 9,522,621 B2 | 12/2016 | Krajenke et al. | |
| 9,725,942 B2 | 8/2017 | Gunreben et al. | |
| 9,797,180 B2 | 10/2017 | Salmon et al. | |
| 9,994,263 B1 | 6/2018 | Richter | |
| 10,059,161 B1 | 8/2018 | Salter et al. | |
| 10,081,303 B1 | 9/2018 | Ngo et al. | |
| 10,103,488 B2 | 10/2018 | Ghannam et al. | |
| 10,220,839 B2 | 3/2019 | Lavoie | |
| 10,246,137 B2 | 4/2019 | Ngo | |
| 10,577,852 B2 | 3/2020 | Lewis et al. | |
| 10,927,581 B2 | 2/2021 | Nania et al. | |
| 10,941,602 B2 | 3/2021 | Ghannam et al. | |
| 11,208,157 B2 | 12/2021 | Borkar et al. | |
| 2001/0042985 A1* | 11/2001 | Hodge | B60P 3/14 296/26.08 |
| 2002/0084675 A1 | 7/2002 | Buchanan et al. | |
| 2004/0174035 A1 | 9/2004 | Acker et al. | |
| 2005/0067851 A1 | 3/2005 | Kang et al. | |
| 2005/0088848 A1 | 4/2005 | Miller et al. | |
| 2007/0096944 A1 | 5/2007 | Hendry et al. | |
| 2009/0079217 A1 | 3/2009 | Bakshi et al. | |
| 2012/0126564 A1 | 5/2012 | Hausler et al. | |
| 2015/0217685 A1 | 8/2015 | Salter et al. | |
| 2016/0075286 A1 | 3/2016 | Butlin, Jr. et al. | |
| 2016/0160553 A1 | 6/2016 | Nania | |
| 2017/0282979 A1 | 10/2017 | Singer | |
| 2017/0291551 A1 | 10/2017 | Krajenke et al. | |
| 2019/0226263 A1 | 7/2019 | Kishino et al. | |
| 2019/0249479 A1 | 8/2019 | Lewis et al. | |
| 2020/0141171 A1 | 5/2020 | Ghannam et al. | |
| 2020/0148283 A1 | 5/2020 | Robinson et al. | |
| 2020/0378170 A1 | 12/2020 | Kerr | |
| 2021/0025216 A1 | 1/2021 | Salter et al. | |
| 2021/0070377 A1* | 3/2021 | Banks, Jr. | B62D 33/0273 |
| 2021/0155296 A1 | 5/2021 | Povinelli et al. | |
| 2021/0039722 A1 | 9/2021 | Williamson et al. | |
| 2022/0136297 A1* | 5/2022 | Roberson | E05D 15/262 49/37 |
| 2023/0322309 A1 | 10/2023 | Banks, Jr. et al. | |

FOREIGN PATENT DOCUMENTS

| | | |
|---|---|---|
| DE | 102009055778 A1 | 6/2011 |
| DE | 102012209048 A1 | 12/2013 |
| EP | 2033817 B1 | 3/2009 |
| EP | 1422366 B1 | 5/2014 |
| EP | 3219894 B1 | 9/2017 |

OTHER PUBLICATIONS

Notice of Allowance for U.S. Appl. No. 16/816,441, mailed Sep. 13, 2021, 21 pages.

Non-Final Office Action for U.S. Appl. No. 17/514,831, mailed Sep. 29, 2022, 17 pages.

Notice of Allowance for U.S. Appl. No. 17/514,831, mailed Apr. 4, 2023, 19 pages.

Non-Final Office Action for U.S. Appl. No. 18/325,661, mailed Feb. 28, 2024, 19 pages.

Author Unknown, "GMC Sierra MultiPro Tailgate—New Innovation for New Truck!", Goldstein Buick GMC Blog, https://www.goldsteinbuick.com/blogs/1825/cool-news/gmc-sierra-multipro-tailgate-2020/, Sep. 4, 2019, 6 pages.

Author Unknown, "2019 Sierra 1500 MultiPro Tailgate," TechLink, vol. 20, No. 15, https://techlink.mynetworkcontent.com/wp-content/uploads/2018/09/GM_TechLink_15_August_2018.pdf, Aug. 2018, 5 pages.

Elmer, Stephen, "2019 Ram 1500 Multifunction Tailgate Adds Barn Doors to the Bed," The Fast Lane Truck, https://tfltruck.com/2019/02/2019-ram-1500-multifunction-tailgate-adds-barn-doors-to-the-bed/, Feb. 5, 2019, 5 pages.

Lareau, Jamie L., "GM engineers hid secret tailgate in storage room for 2 years," Detroit Free Press, May 18, 2019, 10 pages.

Thome, David, "Pickup truck tailgates join the high-tech revolution," On Milwaukee, https://onmilwaukee.com/articles/high-tech-pickup-truck-tailgates, Apr. 16, 2019, 3 pages.

Weaver, Alistair, "2019 Tech Driven Awards," Edmunds, https://www.edmunds.com/roadnoise/awards/tech-driven.html, Feb. 26, 2019, 8 pages.

* cited by examiner

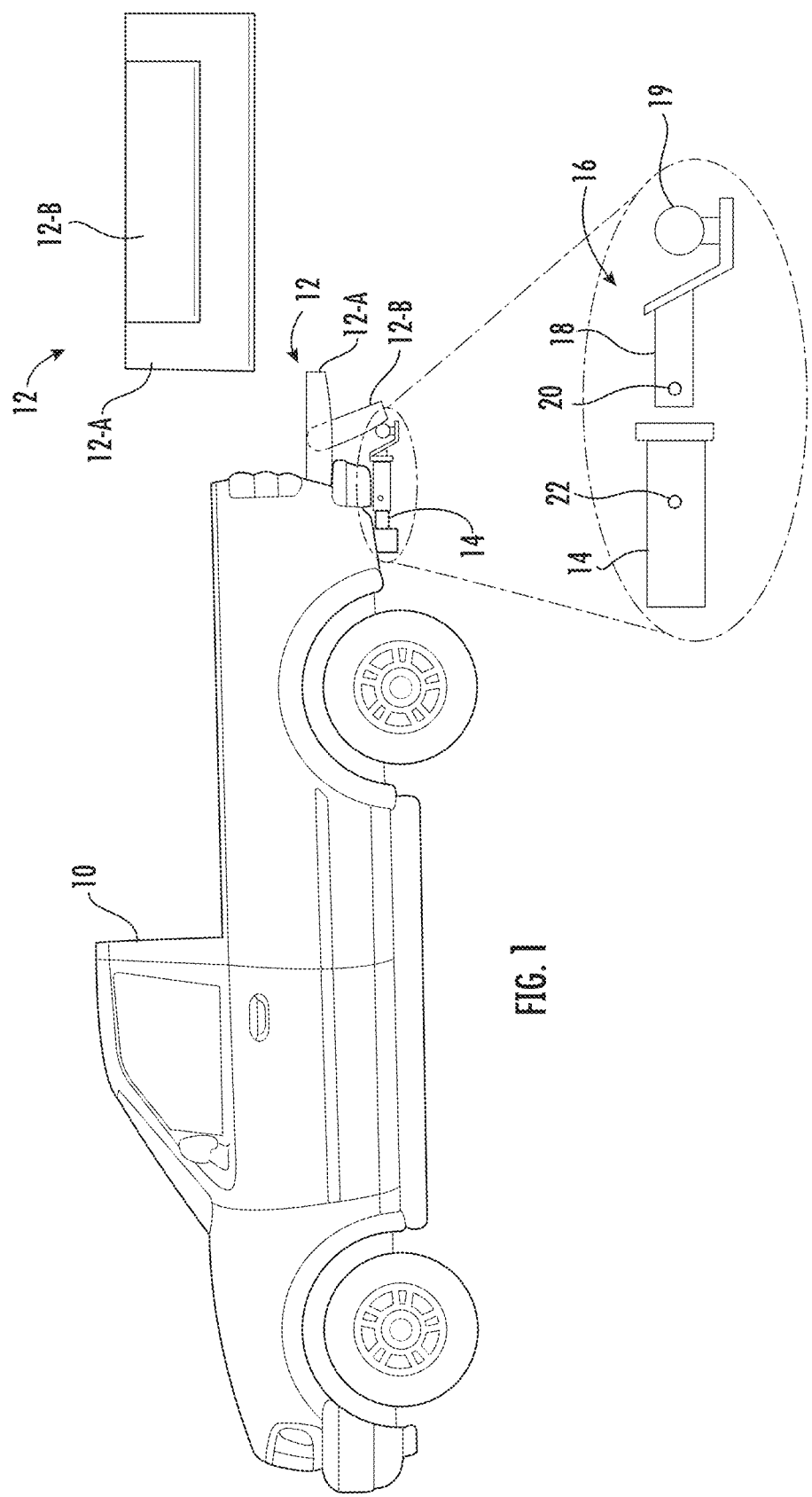

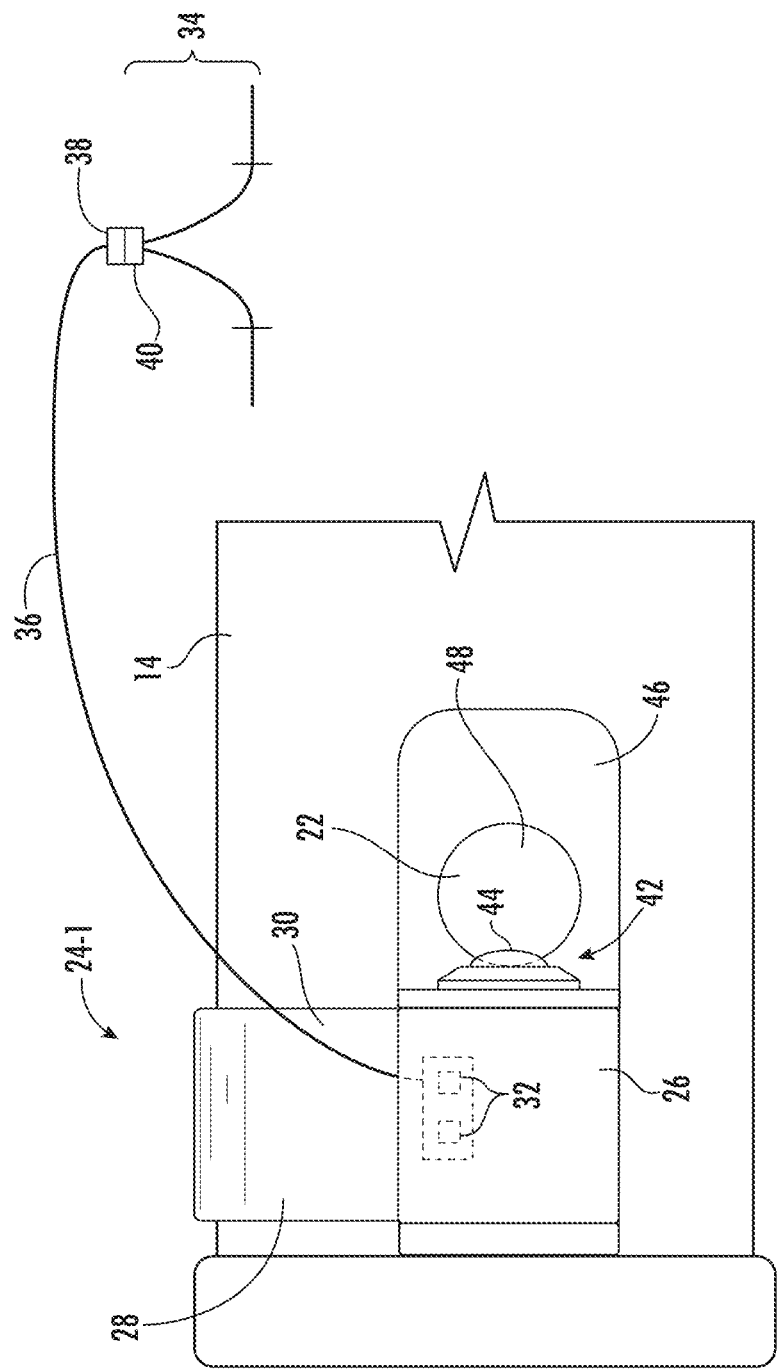
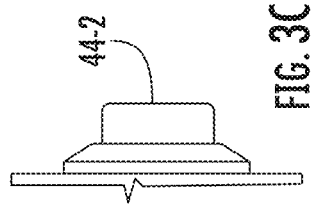
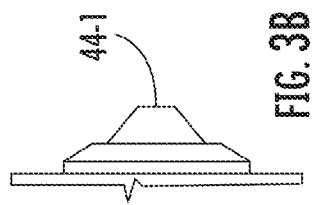
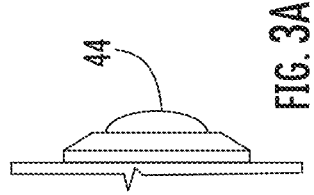

TAILGATE DEACTIVATION SYSTEM

RELATED APPLICATIONS

This application is a continuation of co-pending U.S. patent application Ser. No. 18/325,661, filed on May 30, 2023, entitled "TAILGATE DEACTIVATION SYSTEM," which is a continuation of U.S. patent application Ser. No. 17/514,831, filed on Oct. 29, 2021, entitled "TAILGATE DEACTIVATION SYSTEM," which issued as U.S. Pat. No. 11,702,148 B2 on Jul. 18, 2023, which is a continuation of U.S. patent application Ser. No. 16/816,441, filed on Mar. 12, 2020, entitled "TAILGATE DEACTIVATION SYSTEM," which issued as U.S. Pat. No. 11,161,555 B2 on Nov. 2, 2021, and which claims the benefit of U.S. Provisional Application No. 62/896,878, filed on Sep. 6, 2019, entitled "TAILGATE DEACTIVATION SYSTEM," and U.S. Provisional Application No. 62/935,231, filed on Nov. 14, 2019, entitled "MANUAL TAILGATE DEACTIVATION SYSTEM," the disclosures of all of which are hereby incorporated herein by reference in their entireties.

BACKGROUND

Tailgates of vehicles that are capable of pivoting below the bed of the vehicle may impact towing apparatus, and damage the tailgate and/or the towing apparatus.

SUMMARY

The embodiments disclosed herein include a tailgate deactivation system that deactivates the inner gate panel of a multi-panel tailgate to inhibit movement of the inner gate panel with respect to the primary gate panel, and thus prevent the inner gate panel from being inadvertently pivoted downward into a towing apparatus that is coupled to the vehicle.

In a first embodiment a tailgate deactivation system is provided. The tailgate deactivation system includes a switch, which includes two terminals configured to be electrically coupled to a tailgate power circuit that supplies power to at least a portion of a tailgate of a vehicle, and an actuator configured to electrically couple the two terminals in an on state to allow power to flow in the tailgate power circuit, and to electrically decouple the two terminals in an off state to inhibit power from flowing in the tailgate power circuit.

In another embodiment, a tailgate deactivation system is provided which includes a switch, the switch including two terminals configured to be electrically coupled to a tailgate power circuit that supplies power to an inner gate panel of a multi-panel tailgate that includes a primary gate panel and the inner gate panel, and an actuator configured to electrically couple the two terminals in an on state to allow power to flow in the tailgate power circuit to facilitate movement of the inner gate panel with respect to the primary gate panel, and to electrically decouple the two terminals in an off state to inhibit power from flowing in the tailgate power circuit to inhibit movement of the inner gate panel with respect to the primary gate panel.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 1 is a schematic block diagram of a vehicle with a multi-panel tailgate;

FIG. 2 illustrates a schematic of a tailgate deactivation system according to one embodiment;

FIGS. 3A-3C illustrate various example actuation surfaces according to different embodiments;

DETAILED DESCRIPTION

Figure 4:
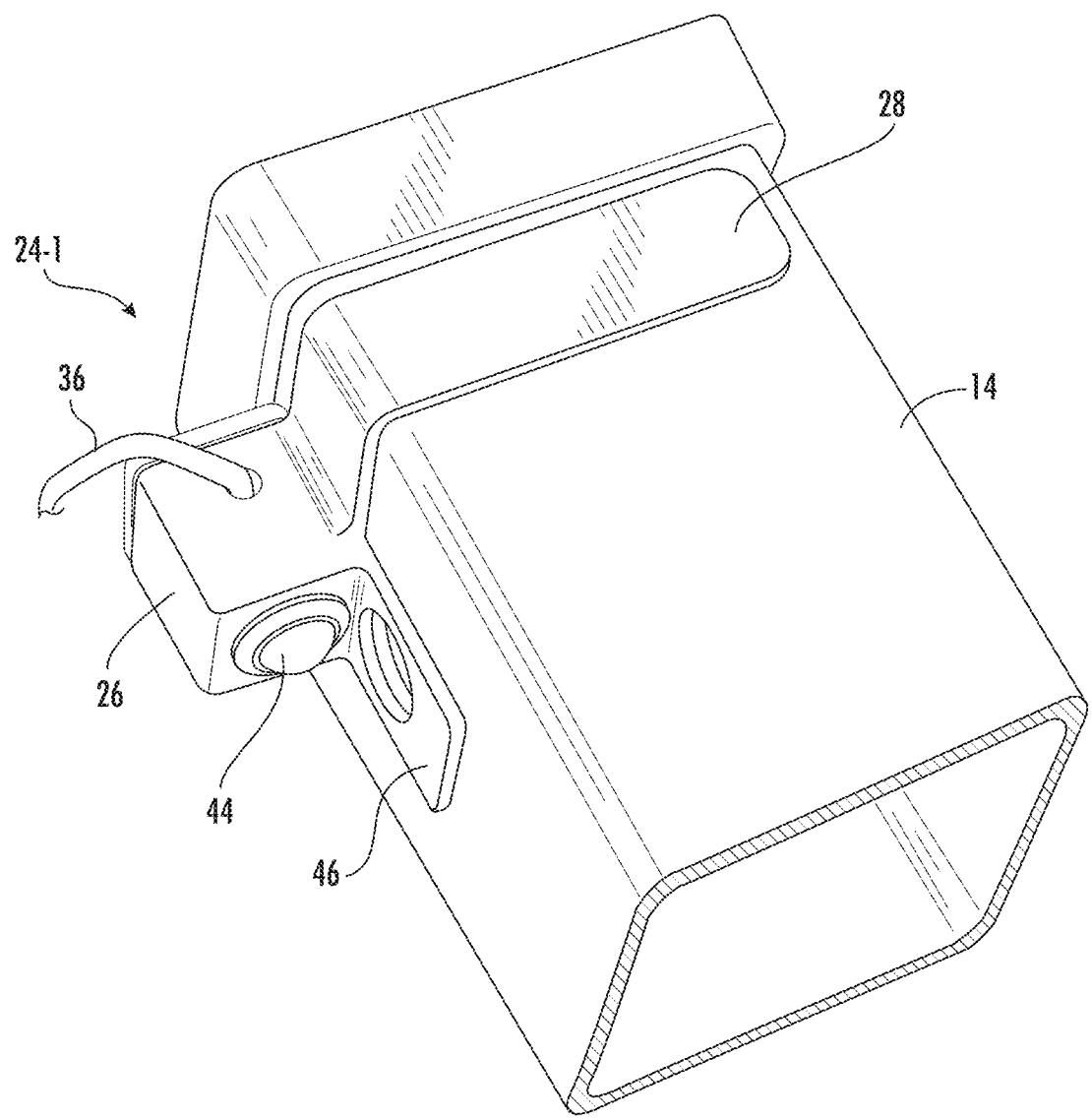
FIG. 4 is a perspective view of the tailgate deactivation system illustrated in FIG. 2.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Certain vehicles, including pickup trucks, utilize multi-panel tailgates that include a primary gate panel and an inner gate panel, which allow operators to quickly configure the tailgate into any of several different tailgate configurations. In certain configurations, when the primary gate panel is positioned in a substantially horizontal plane (e.g., the tailgate is open), the inner gate panel is capable of pivoting below the horizontal plane to a nearly vertical plane. If a towing apparatus, such as a ball mount system, has been installed on the vehicle, the inner gate panel is capable of impacting the towing apparatus and damaging the inner gate panel.

The embodiments disclosed herein include a tailgate deactivation system that deactivates the inner gate panel of a multi-panel tailgate to inhibit movement of the inner gate panel with respect to the primary gate panel, and thus prevent the inner gate panel from being inadvertently pivoted downward into a towing apparatus that is coupled to the vehicle.

FIG. 1 is a schematic block diagram of a vehicle 10 with a multi-panel tailgate 12. The multi-panel tailgate 12 includes a primary gate panel 12-A and an inner gate panel 12-B, each of which may open (i.e., pivot) independently of one another. While for purposes of illustration the multi-panel tailgate 12 has only two panels, the embodiments herein apply to multi-panel tailgates that have more than two panels. The vehicle 10 may comprise any vehicle having a multi-panel tailgate in which at least one panel of the multi-panel tailgate, when opened, is capable of pivoting below the bed of the vehicle 10. By way of non-limiting example, the multi-panel tailgate 12 may comprise a GMC® Sierra® brand pickup truck, such as Models 1500, 2500, and 3500, model years 2019, 2020, or the like, although the embodiments are not limited to any particular vehicle or to any particular multi-panel tailgate.

The vehicle 10 includes a hitch receiver tube 14. A ball mount system 16 is mounted within the hitch receiver tube 14. The ball mount system 16 includes a shaft 18 that has two opposing shaft openings 20 (only one shaft opening 20 seen in FIG. 1), and a trailer hitch ball 19. To couple the ball mount system 16 to the hitch receiver tube 14, the operator inserts the shaft 18 into the hitch receiver tube 14 until the shaft openings 20 align with two hitch pin openings 22 (only one hitch pin opening 22 seen in FIG. 1). A hitch pin (not illustrated) may then be installed into the hitch pin openings 22 and shaft openings 20 to lock the ball mount system 16 with respect to the hitch receiver tube 14. The embodiments disclosed herein prevent the inner gate panel 12-B of the multi-panel tailgate 12 from opening when a towing apparatus, such as the ball mount system 16, is coupled to the hitch receiver tube 14 to prevent the inner gate panel 12-B from impacting the ball mount system 16 and damaging the inner gate panel 12-B.

FIG. 2 illustrates a schematic of a tailgate deactivation system 24-1 according to one embodiment. The tailgate deactivation system 24-1 includes a switch 26 coupled to a hitch receiver tube mount 28. The hitch receiver tube mount 28 is configured to fix the switch 26 to the hitch receiver tube 14 of the vehicle 10 (FIG. 1). In this embodiment, the hitch receiver tube mount 28 comprises an L-bracket 30 that includes an adhesive (on the underside of the L-bracket 30) for coupling the L-bracket 30 to the hitch receiver tube 14. In other embodiments, the hitch receiver tube mount 28 may comprise a band that completely encircles the hitch receiver tube 14, or may comprise any other mechanism suitable for fixing the switch 26 with respect to the hitch receiver tube 14, such as simply an adhesive strip, or the like. The L-bracket 30 may comprise any suitably rigid material, such as metal, plastic, or the like.

The switch 26 includes two terminals 32 configured to be electrically coupled to a tailgate power circuit 34 that supplies power to at least a portion of the multi-panel tailgate 12 (FIG. 1). The tailgate deactivation system 24-1 may include wires 36 coupled to the terminals 32 that terminate in a plug 38 that can be press-connected with a plug 40 of the tailgate power circuit 34. In other embodiments, where the tailgate power circuit 34 does not include a suitable plug, or where a plug is not desired, the wires 36 may be electrically connected to corresponding wires of the tailgate power circuit 34 via any suitable mechanism, such as soldering, twist-on wire connectors, or the like. In some embodiments, where only the inner gate panel 12-B is capable of impacting the ball mount system 16 (FIG. 1), the tailgate power circuit 34 supplies power to the inner gate panel 12-B.

The switch 26 includes an actuator 42 configured to electrically couple the two terminals 32 in an on state to allow power to flow in the tailgate power circuit 34, and thereby facilitate movement of the inner gate panel 12-B with respect to the primary gate panel 12-A. In an off state, the actuator 42 decouples the two terminals 32 to inhibit power from flowing in the tailgate power circuit 34 and to inhibit movement of the inner gate panel 12-B with respect to the primary gate panel 12-A.

The actuator 42 comprises an actuation surface 44 that is configured to cause the switch 26 to transition from the on state to the off state by the coupling of the ball mount system 16 to the hitch receiver tube 14. Thus, an operator need only perform their normal process for coupling the ball mount system 16 to the hitch receiver tube 14 to transition the switch 26 to the off state, and thereby disable the ability for the inner gate panel 12-B to pivot below the primary gate panel 12-A and accidentally contact the ball mount system 16.

The actuation surface 44, in this embodiment, is configured to transition the switch 26 from the on state to the off state in response to a hitch pin (sometimes referred to as a lock pin) being inserted through the hitch pin openings 22 of the hitch receiver tube 14 as the ball mount system 16 is coupled to the hitch receiver tube 14. As illustrated, the hitch receiver tube mount 28 is positioned on the hitch receiver tube 14 to couple the actuation surface 44 with respect to the hitch pin opening 22, such that installation of a hitch pin during the process of coupling the ball mount system 16 to the hitch receiver tube 14 causes the switch 26 to be placed in the off state.

In this particular embodiment, the actuation surface 44 is placed in a path of a shaft portion of a hitch pin, so that installation of the hitch pin causes the shaft portion of the hitch pin to contact the actuation surface 44. In this embodiment, the tailgate deactivation system 24-1 includes a tab 46 that forms an opening 48, which can be positioned during installation to be co-linear with one of the hitch pin openings 22 of the hitch receiver tube 14 to facilitate positioning the actuation surface 44 and the hitch receiver tube mount 28 at a proper location with respect to the hitch pin opening 22. It will be apparent that the actuation surface 44 could be located at other locations on the hitch receiver tube 14 to cause the switch 26 to be activated during the coupling of the ball mount system 16 to the hitch receiver tube 14. It will also be apparent that the actuation surface 44 could be activated by the installation of a hitch pin even if not located to be co-linear with the hitch pin openings 22 depending on the shape and configuration of the hitch pin. For example, the actuation surface 44 may be placed at a location to be contacted by a stop collar of a hitch pin, or placed at a location where a hitch pin accessory, such as a hitch pin lock, makes contact with the actuation surface 44. It will also be appreciated that the switch 26 may comprise any suitable type of switch, such as a proximity switch or the like, that can be activated by the coupling of the ball mount system 16 to the hitch receiver tube 14.

FIGS. 3A-3C illustrate various example actuation surfaces 44, 44-1, 44-2 that may be suitable for actuating the switch 26 during installation of a hitch pin, according to different embodiments.

FIG. 4 is a perspective view of the tailgate deactivation system 24-1 coupled to the hitch receiver tube 14 according to one embodiment.

Figure 5:
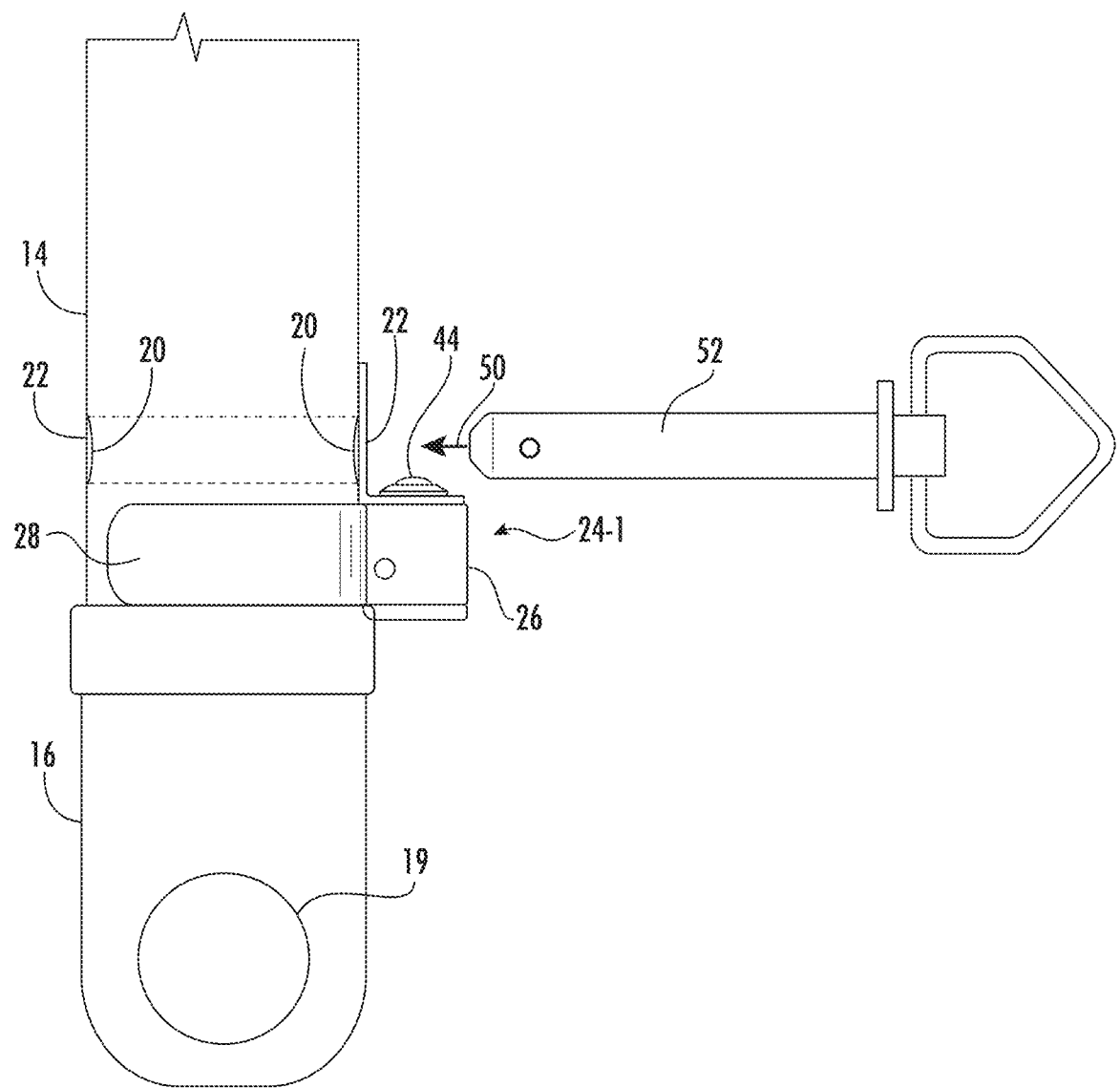
FIG. 5 illustrates a schematic of a hitch pin installation according to one embodiment.

FIG. 5 is a schematic illustrating a hitch pin installation according to one embodiment. In this embodiment, the tailgate deactivation system 24-1 is configured such that the actuation surface 44 is placed in a path 50 of a hitch pin 52 during installation of the hitch pin 52 in the hitch pin openings 22 of the hitch receiver tube 14 and the shaft openings 20 of the shaft 18 of the ball mount system 16. As the hitch pin 52 is installed, a portion of the hitch pin 52, in this example a shaft portion of the hitch pin 52, contacts the actuation surface 44 and thereby causes the switch 26 to be placed into the off state, thereby inhibiting power from flowing to the tailgate power circuit 34 of the multi-panel tailgate 12. It will be apparent that, in this embodiment, the hitch pin 52 may also be inserted into the hitch pin openings 22 from the opposite direction of that shown in FIG. 5 to thereby contact the actuation surface 44.

Figure 6:
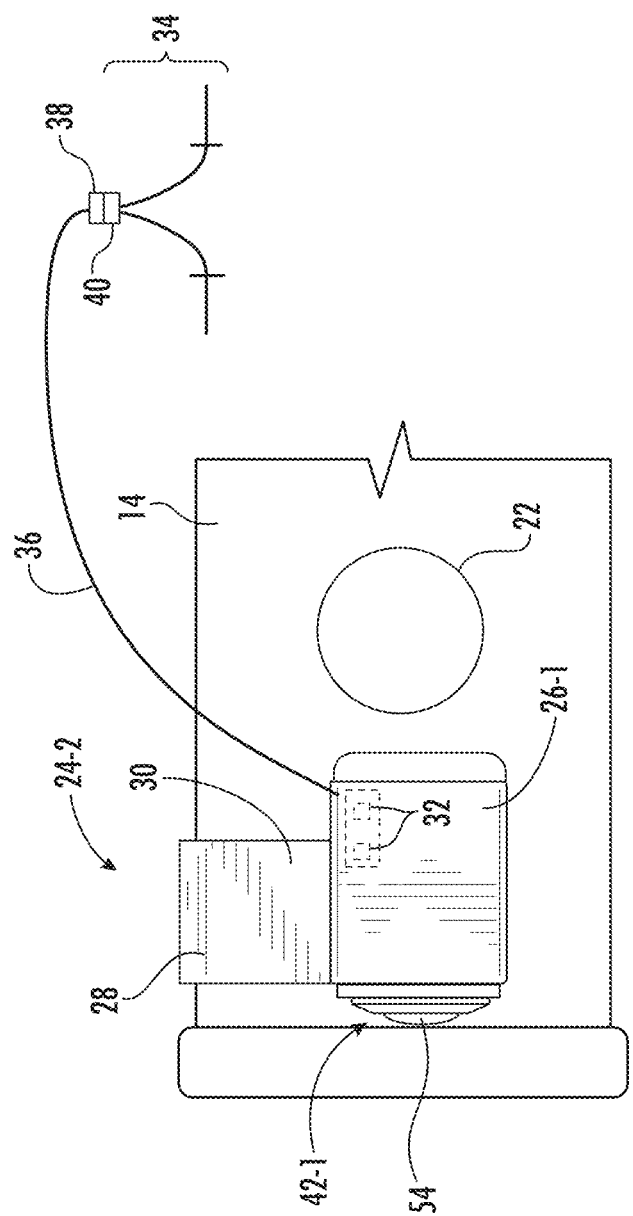
FIG. 6 illustrates a schematic of a tailgate deactivation system according to another embodiment.

FIG. 6 illustrates a schematic of a tailgate deactivation system 24-2 according to another embodiment. The tailgate deactivation system 24-2 is substantially similar to the tailgate deactivation system 24-1, except as otherwise discussed herein. The tailgate deactivation system 24-2 includes the hitch receiver tube mount 28 which is configured to fix a switch 26-1 to the hitch receiver tube 14 of the vehicle 10 (FIG. 1). In this embodiment, the hitch receiver tube mount 28 comprises the L-bracket 30 that includes an adhesive (on the underside of the L-bracket) for coupling the L-bracket 30 to the hitch receiver tube 14. In other embodiments, the hitch receiver tube mount 28 may comprise a band that completely encircles the hitch receiver tube 14, or any other mechanism suitable to fixing the switch 26-1 with respect to the hitch receiver tube 14, such as simply an adhesive strip, or the like.

The switch 26-1 includes the two terminals 32 configured to be electrically coupled to the tailgate power circuit 34 that supplies power to at least a portion of the multi-panel tailgate 12 (FIG. 1). The tailgate deactivation system 24-2 may include the wires 36 coupled to the terminals 32 that terminate in the plug 38 that can be press-connected with the plug 40 of the tailgate power circuit 34. In other embodiments, where the tailgate power circuit 34 does not include a suitable plug, the wires 36 may be electrically connected to corresponding wires of the tailgate power circuit 34 via any suitable mechanism, such as soldering, twist-on wire connectors, or the like. In some embodiments, where only the inner gate panel 12-B is capable of impacting the ball mount system 16 (FIG. 1), the tailgate power circuit 34 supplies power to the inner gate panel 12-B.

The switch 26-1 includes an actuator 42-1 configured to, in an on state, electrically couple the two terminals 32 to allow power to flow in the tailgate power circuit 34, and thereby facilitate movement of the inner gate panel 12-B with respect to the primary gate panel 12-A. In an off state, the actuator 42-1 decouples the two terminals 32 to inhibit power from flowing in the tailgate power circuit 34, and thereby inhibit movement of the inner gate panel 12-B with respect to the primary gate panel 12-A. In this embodiment, the actuator 42-1 is configured to be actuated by the exertion of physical force by an operator or other individual against the actuator 42-1 to manually depress the actuator 42-1. In this example, the actuator 42-1 includes an actuation surface in the form of a manual push-button 54, and the operator urges the manual push-button 54 to cause the switch 26-1 to be in the on state to allow power to flow in the tailgate power circuit 34. Pressing the manual push-button 54 a second time causes the switch 26-1 to be in the off state to inhibit power from flowing in the tailgate power circuit 34. Note that the L-bracket 30, in this example, positions the push-button 54 to face in a direction behind the vehicle.

Figure 7:
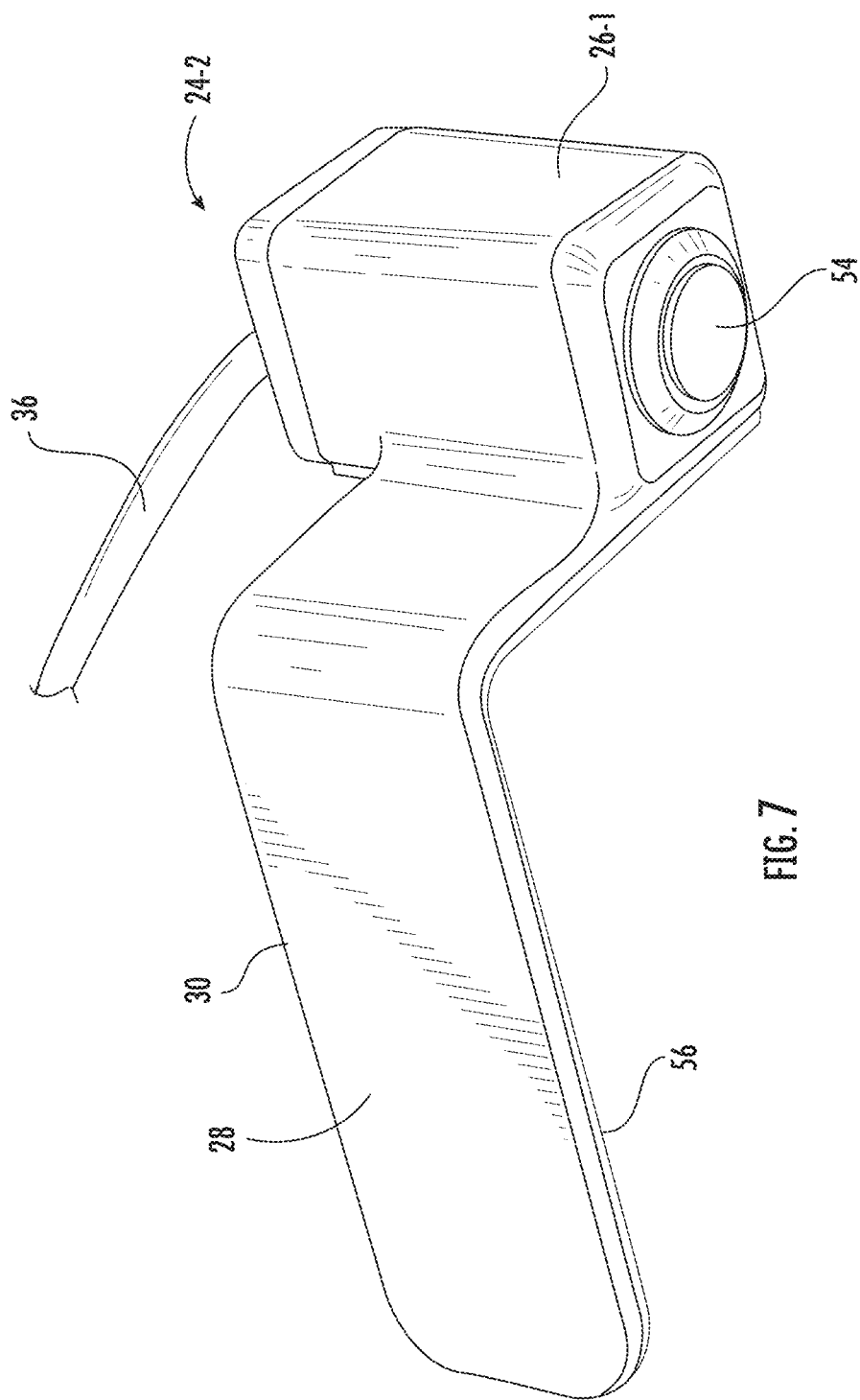
FIG. 7 is a perspective view of the tailgate deactivation system illustrated in FIG. 6.

FIG. 7 is a perspective view of the tailgate deactivation system 24-2 illustrated in FIG. 6. The tailgate deactivation system 24-2 may include an adhesive strip 56 coupled to the underside of the L-bracket 30 to facilitate attachment of the L-bracket 30 to the hitch receiver tube 14.

Figure 8:
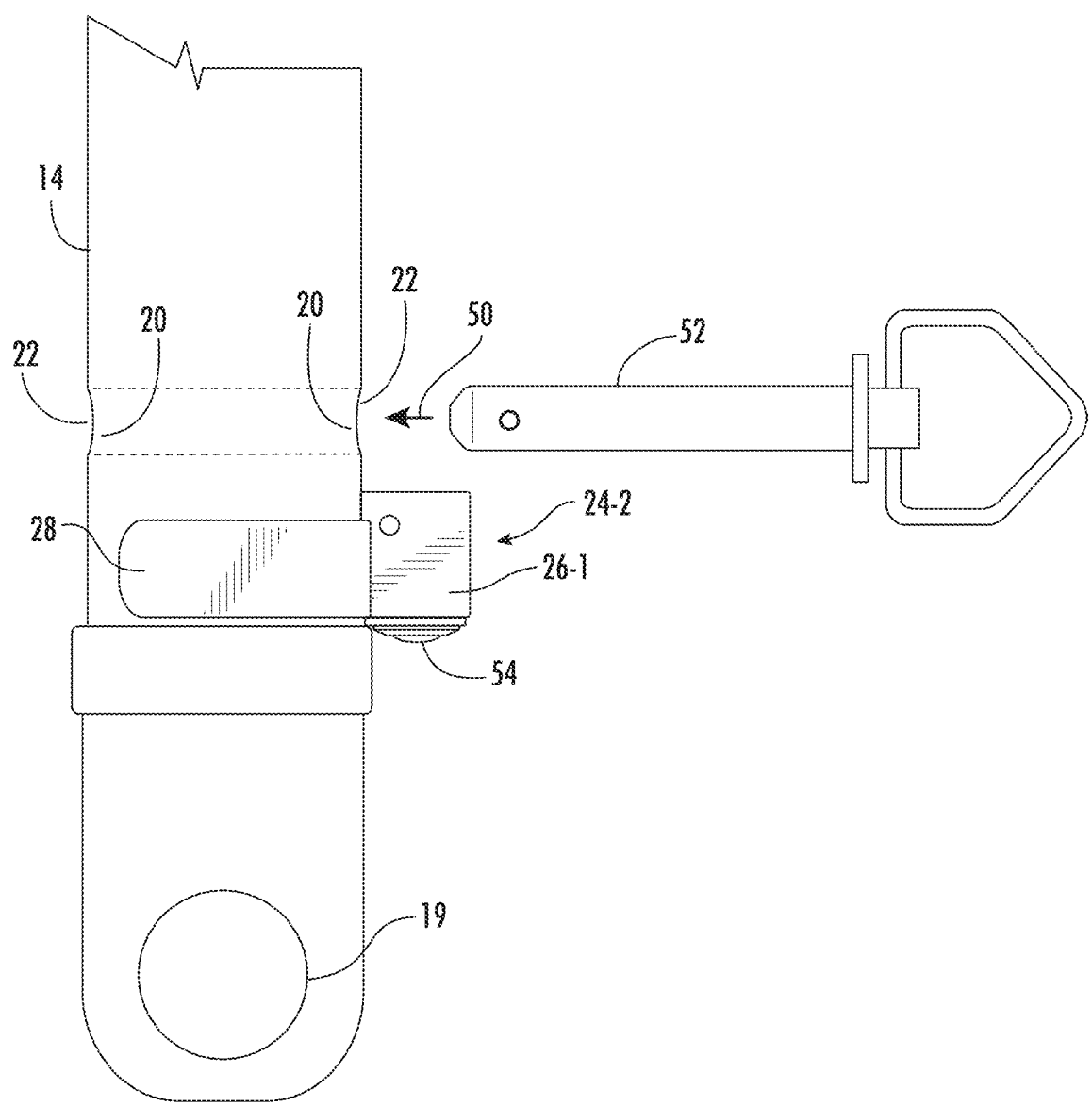
FIG. 8 illustrates a schematic of a hitch pin installation according to another embodiment.

FIG. 8 illustrates a schematic of a hitch pin installation according to another embodiment. In this embodiment, the tailgate deactivation system 24-2 is configured such that the push-button 54 faces a direction behind the vehicle to facilitate easy actuation by an operator.

Those skilled in the art will recognize improvements and modifications to the preferred embodiments of the disclosure. All such improvements and modifications are considered within the scope of the concepts disclosed herein and the claims that follow.

What is claimed is:

1. A method, comprising:
by a vehicle having a hitch receiver apparatus and a multi-functional tailgate having a primary gate panel with an inner gate panel, with the inner gate panel being rotatable about a first horizontal axis extending through the primary gate panel a certain distance above a second horizontal axis about which the primary gate panel is rotatable, with the primary gate panel being configured to pivot between an upward vertical position and a horizontal position relative to a vehicle bed of the vehicle and with the inner gate panel being configured to independently pivot relative to the primary gate panel, with the inner gate panel being further configured to be pivoted to a downward vertical position while the primary gate panel is in the horizontal position relative to the vehicle bed such that a portion of the inner gate panel is proximate the hitch receiver apparatus;
controlling a circuitry operable to enable or disable power delivery associated with the inner gate panel to configure the multi-functional tailgate in one of a set of multi-functional tailgate configurations, including:
a first configuration with the primary gate panel in the horizontal position and enabled to be pivoted and the inner gate panel inhibited from being downwards pivoted;
a second configuration with the primary gate panel in the horizontal position and enabled to be pivoted and the inner gate panel enabled to be downwards pivoted;
a third configuration with the primary gate panel in the upward vertical position and enabled to be pivoted and the inner gate panel inhibited from being downwards pivoted; and
a fourth configuration with the primary gate panel in the upward vertical position and enabled to be pivoted and the inner gate panel enabled to be downwards pivoted.

2. The method of claim 1, wherein the circuitry includes:
a switch circuitry configured to have an on state and an off state, wherein, in the on state, the switch circuitry is configured to enable the power delivery associated with the inner gate panel, and wherein, in the off state, the switch circuitry is configured to inhibit the power delivery associated with the inner gate panel.

3. The method of claim 1, wherein the circuitry includes:
a switch circuitry configured to be electrically coupled to a tailgate power circuitry that supplies power to the multi-functional tailgate, with the switch circuitry having an on state and an off state, wherein, in the on state, the switch circuitry is configured to enable power delivery from the tailgate power circuitry, and wherein, in the off state, the switch circuitry is configured to inhibit the power delivery from the tailgate power circuitry.

4. The method of claim 1, wherein the controlling step is based on an input signal associated with the inner gate panel being enabled or inhibited from being downwards pivoted relative to the primary gate panel.

5. A vehicle, comprising:
a hitch receiver apparatus;
a vehicle bed;
a multi-functional tailgate having a primary gate panel with an inner gate panel, with the inner gate panel being rotatable about a first horizontal axis extending through the primary gate panel a certain distance above a second horizontal axis about which the primary gate panel is rotatable, with the primary gate panel being configured to pivot between an upward vertical position and a horizontal position relative to the vehicle bed and with the inner gate panel being configured to independently pivot relative to the primary gate panel, with the inner gate panel being further configured to be pivoted to a downward vertical position while the primary gate panel is in the horizontal position relative to the vehicle bed such that a portion of the inner gate panel is proximate the hitch receiver apparatus;
a circuitry operable to enable or disable power delivery associated with the inner gate panel; and
wherein the vehicle is operable to control the circuitry to configure the multi-functional tailgate in one of a set of multi-functional tailgate configurations, including:
a first configuration with the primary gate panel in the horizontal position and enabled to be pivoted and the inner gate panel inhibited from being downwards pivoted;
a second configuration with the primary gate panel in the horizontal position and enabled to be pivoted and the inner gate panel enabled to be downwards pivoted;
a third configuration with the primary gate panel in the upward vertical position and enabled to be pivoted and the inner gate panel inhibited from being downwards pivoted; and
a fourth configuration with the primary gate panel in the upward vertical position and enabled to be pivoted and the inner gate panel enabled to be downwards pivoted.

6. The vehicle of claim 5, wherein the circuitry includes:
a switch circuitry configured to have an on state and an off state, wherein, in the on state, the switch circuitry is configured to enable the power delivery associated with the inner gate panel, and wherein, in the off state, the switch circuitry is configured to inhibit the power delivery associated with the inner gate panel.

7. The vehicle of claim 5, wherein the circuitry includes:
a switch circuitry configured to be electrically coupled to a tailgate power circuitry that supplies power to the multi-functional tailgate, with the switch circuitry having an on state and an off state, wherein, in the on state, the switch circuitry is configured to enable power delivery from the tailgate power circuitry, and wherein, in the off state, the switch circuitry is configured to inhibit the power delivery from the tailgate power circuitry.

8. The vehicle of claim 5, wherein the vehicle is further operable to control the circuitry based on an input signal associated with the inner gate panel being enabled or inhibited from being downwards pivoted relative to the primary gate panel.

9. A method, comprising:
by a vehicle having a hitch receiver apparatus and a multi-functional tailgate having a primary gate panel with an inner gate panel, wherein the inner gate panel is rotatable about a first horizontal axis extending through the primary gate panel a certain distance above a second horizontal axis about which the primary gate panel is rotatable, with the primary gate panel being configured to pivot between an upward vertical position and a horizontal position relative to the vehicle and with the inner gate panel being configured to independently pivot relative to the primary gate panel, with the inner gate panel being further configured to be pivoted to a downward vertical position while the primary gate panel is in the horizontal position relative to the vehicle such that a portion of the inner gate panel is proximate the hitch receiver apparatus of the vehicle, with the vehicle also including a power source operable to deliver power associated with the inner gate panel to enable the inner gate panel to be downwards pivoted relative to the primary gate panel and including a circuitry electrically coupled between the power source and the inner gate panel and operable to enable or disable power delivery associated with the inner gate panel by the power source so that the inner gate panel can be respectively enabled to be downwards pivoted or inhibited from being downwards pivoted relative to the primary gate panel; and
controlling the circuitry to enable or disable the power delivery associated with the inner gate panel based on an input signal associated with the inner gate panel being enabled or inhibited from being downwards pivoted relative to the primary gate panel.

10. The method of claim 9, wherein the circuitry includes:
a switch circuitry configured to have an on state and an off state, wherein, in the off state, the switch circuitry is configured to enable the power delivery associated with the inner gate panel, and wherein, in the off state, the switch circuitry is configured to inhibit the power delivery associated with the inner gate panel.

11. The method of claim 9, wherein the circuitry includes:
a switch circuitry configured to be electrically coupled to a tailgate power circuitry that supplies power to the multi-functional tailgate, with the switch circuitry having an on state and an off state, wherein, in the on state, the switch circuitry is configured to enable power delivery from the tailgate power circuitry, and wherein, in the off state, the switch circuitry is configured to inhibit the power delivery from the tailgate power circuitry.

12. The method of claim 9, wherein the vehicle is operable to control the circuitry to configure the multi-functional tailgate in one of a set of multi-functional tailgate configurations, including:
a first configuration with the primary gate panel in the horizontal position and enabled to be pivoted and the inner gate panel inhibited from being downwards pivoted;
a second configuration with the primary gate panel in the horizontal position and enabled to be pivoted and inner gate panel enabled to be downwards pivoted;

a third configuration with the primary gate panel in the upward vertical position and enabled to be pivoted and the inner gate panel inhibited from being downwards pivoted; and a fourth configuration with the primary gate panel in the upward vertical position and enabled to be pivoted and the inner gate panel enabled to be downwards pivoted.

13. The method of claim 9, wherein the power source is a battery.

14. A vehicle, comprising:
    a hitch receiver apparatus;
    a vehicle bed;
    a multi-functional tailgate having a primary gate panel with an inner gate panel, with the inner gate panel being rotatable about a first horizontal axis extending through the primary gate panel a certain distance above a second horizontal axis about which the primary gate panel is rotatable, the primary gate panel being configured to pivot between an upward vertical position and a horizontal position relative to the vehicle bed and with the inner gate panel being configured to independently pivot relative to the primary gate panel;
    a power source operable to deliver power to the multi-functional tailgate to enable the inner gate panel to be pivoted relative to the primary gate panel; and
    a circuitry electrically coupled between the power source and the multi-functional tailgate and operable to enable or disable power delivery associated with the inner gate panel by the power source; and
    wherein the vehicle is operable to control the circuitry to enable or disable the power delivery associated with the inner gate panel based on an input signal associated with the inner gate panel being enabled or inhibited from being downwards pivoted relative to the primary gate panel.

15. The vehicle of claim 14, wherein the circuitry includes:
    a switch circuitry configured to have an on state and an off state, wherein, in the on state, the switch circuitry is configured to enable the power delivery associated with the inner gate panel, and wherein, in the off state, the switch circuitry is configured to inhibit the power delivery associated with the inner gate panel.

16. The vehicle of claim 14, wherein the circuitry includes:
    a switch circuitry configured to be electrically coupled to a tailgate power circuitry that supplies power to the multi-functional tailgate inner gate panel, with the switch circuitry having an on state and an off state, wherein, in the on state, the switch circuitry is configured to enable power delivery from the tailgate power circuitry, and wherein, in the off state, the switch circuitry is configured to inhibit the power delivery from the tailgate power circuitry.

17. The vehicle of claim 14, wherein the vehicle is operable to control the circuitry to configure the multi-functional tailgate in one of a set of multi-functional tailgate configurations, including:
    a first configuration with the primary gate panel in the horizontal position and enabled to be pivoted and the inner gate panel inhibited from being downwards pivoted;
    a second configuration with the primary gate panel in the horizontal position and enabled to be pivoted and the inner gate panel enabled to be downwards pivoted;
    a third configuration with the primary gate panel in the upward vertical position and enabled to be pivoted and the inner gate panel inhibited from being downwards pivoted; and
    a fourth configuration with the primary gate panel in the upward vertical position and enabled to be pivoted and the inner gate panel enabled to be downwards pivoted.

18. The vehicle of claim 14, wherein the power source is a battery.

19. A method, comprising:
    by a vehicle having a hitch receiver apparatus and a multi-functional tailgate having a primary gate panel with an inner gate panel, wherein the inner gate panel is rotatable about a first horizontal axis extending through the primary gate panel a certain distance above a second horizontal axis about which the primary gate panel is rotatable, with the primary gate panel being configured to pivot between an upward vertical position and a horizontal position relative to the vehicle and with the inner gate panel being configured to independently pivot relative to the primary gate panel, with the inner gate panel being further configured to be pivoted to a downward vertical position while the primary gate panel is in the horizontal position relative to the vehicle such that a portion of the inner gate panel is proximate the hitch receiver apparatus of the vehicle, with the vehicle also including a switch circuitry configured to have an on state and an off state, wherein, in the on state, the switch circuitry is configured to enable power delivery associated with the inner gate panel, and wherein, in the off state, the switch circuitry is configured to inhibit the power delivery associated with the inner gate panel; and
    controlling the switch circuitry to enable or disable the power delivery associated with the inner gate panel.

20. The method of claim 19, wherein the switch circuitry is further configured to be electrically coupled to a tailgate power circuitry that supplies power to the multi-functional tailgate, wherein, in the on state, the switch circuitry is configured to enable power delivery from the tailgate power circuitry, and wherein, in the off state, the switch circuitry is configured to inhibit the power delivery from the tailgate power circuitry.

21. The method of claim 19, wherein the vehicle is operable to control the switch circuitry to configure the multi-functional tailgate in one of a set of multi-functional tailgate configurations, including:
    a first configuration with the primary gate panel in the horizontal position and enabled to be pivoted and the inner gate panel inhibited from being downwards pivoted;
    a second configuration with the primary gate panel in the horizontal position and enabled to be pivoted and the inner gate panel enabled to be downwards pivoted;
    a third configuration with the primary gate panel in the upward vertical position and enabled to be pivoted and the inner gate panel inhibited from being downwards pivoted; and
    a fourth configuration with the primary gate panel in the upward vertical position and enabled to be pivoted and the inner gate panel enabled to be downwards pivoted.

22. A vehicle, comprising:
    a hitch receiver apparatus;
    a vehicle bed;
    a multi-functional tailgate having a primary gate panel with an inner gate panel, with the inner gate panel being rotatable about a first horizontal axis extending through the primary gate panel a certain distance above a second horizontal axis about which the primary gate panel is rotatable, the primary gate panel being configured to pivot between an upward vertical position and a horizontal position relative to the vehicle bed and with the inner gate panel being configured to independently pivot relative to the primary gate panel, with the inner gate panel being further configured to be pivoted to a downward vertical position while the primary gate panel is in the horizontal position relative to the vehicle bed such that a portion of the inner gate panel is proximate the hitch receiver apparatus;

a switch circuitry configured to enable power delivery associated with the inner gate panel, with the switch circuitry having an on state and an off state, wherein, in the on state, the switch circuitry is configured to enable power delivery associated with the inner gate panel, and wherein, in the off state, the switch circuitry is configured to inhibit the power delivery associated with the inner gate panel; and wherein the vehicle is operable to control the switch circuitry to enable or disable the power delivery associated with the inner gate panel.

23. The vehicle of claim 22, wherein the vehicle is operable to control the switch circuitry to configure the multi-functional tailgate in one of a set of multi-functional tailgate configurations, including:

a first configuration with the primary gate panel in the horizontal position and enabled to be pivoted and the inner gate panel inhibited from being downwards pivoted;

a second configuration with the primary gate panel in the horizontal position and enabled to be pivoted and the inner gate panel enabled to be downwards pivoted;

a third configuration with the primary gate panel in the upward vertical position and enabled to be pivoted and the inner gate panel inhibited from being downwards pivoted; and a fourth configuration with the primary gate panel in the upward vertical position and enabled to be pivoted and the inner gate panel enabled to be downwards pivoted.

* * * * *